May 13, 1941.  H. NAUMANN  2,242,083
YARN TESTING DEVICE
Filed March 11, 1938  2 Sheets-Sheet 1
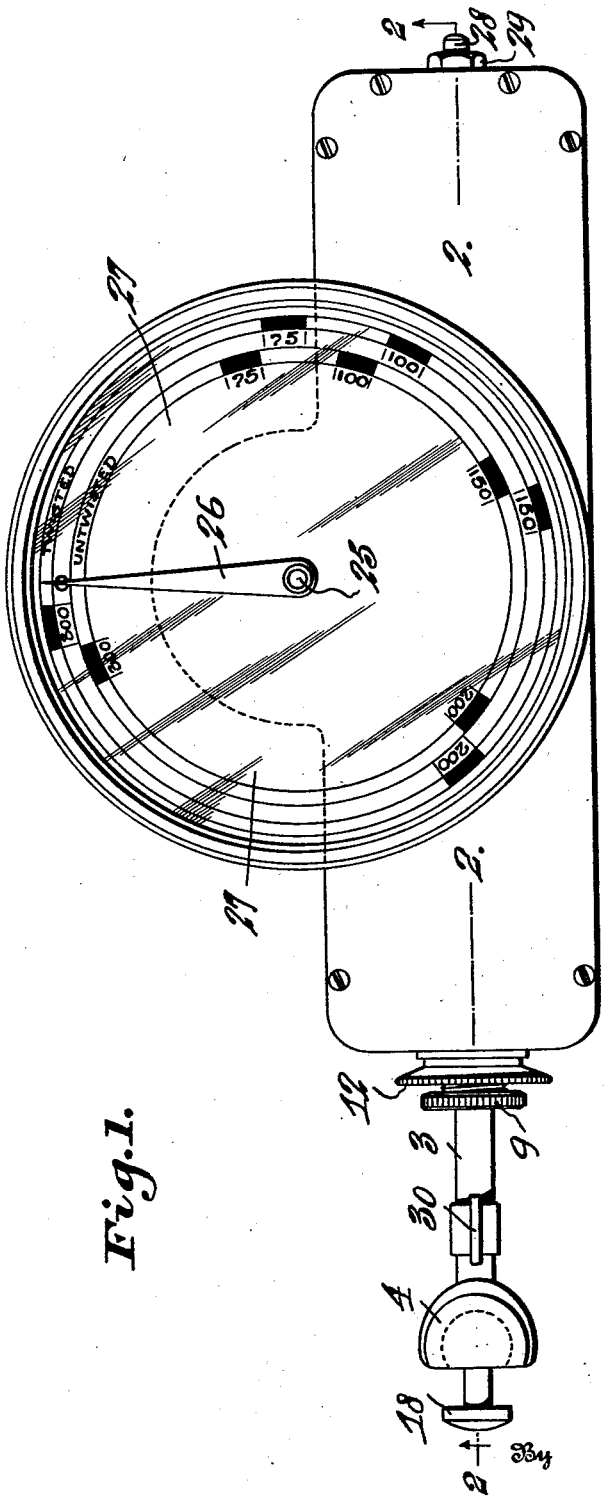
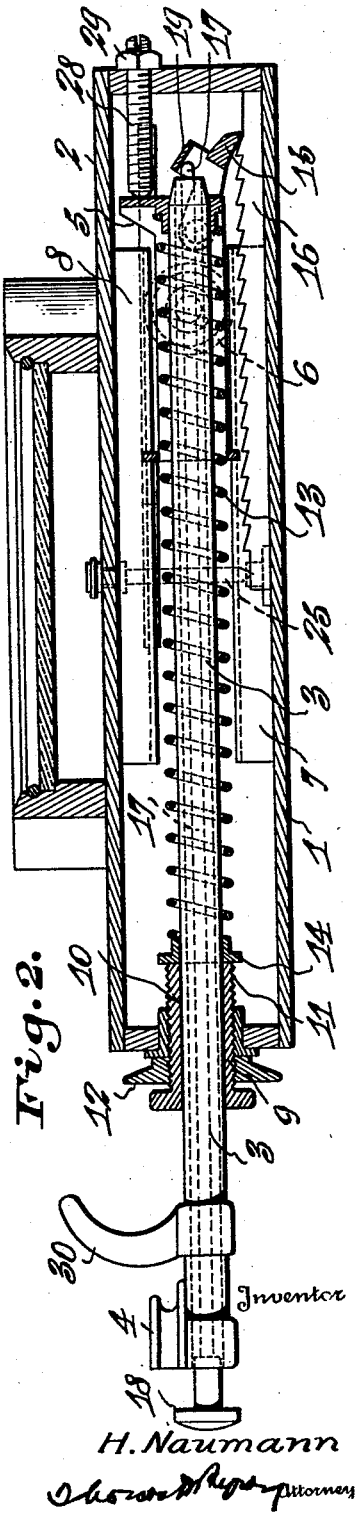
Inventor
H. Naumann May 13, 1941.　　　H. NAUMANN　　　2,242,083
YARN TESTING DEVICE
Filed March 11, 1938　　2 Sheets-Sheet 2

Inventor
H. Naumann
By Thomas H. Byron　Attorney

Patented May 13, 1941

2,242,083

UNITED STATES PATENT OFFICE 2,242,083

YARN TESTING DEVICE

Herbert Naumann, Elizabethton, Tenn., assignor to North American Rayon Corporation, New York, N. Y., a corporation of Delaware Application March 11, 1938, Serial No. 195,259

8 Claims. (Cl. 265—19)

The present invention relates to a device for use in the testing of threads or yarns but more specifically has for its object to devise a novel apparatus for the instant determination of the denier of a yarn or thread.

It is well known that yarns of different denier have different breaking strengths and by placing a strand of yarn on testing machines designed to determine the breaking strength of a yarn the denier of the yarn tested may be deduced. Such machines, however, are usually segregated in a laboratory and it is necessary to carry samples of yarn from the scene of operations and await the results of the tests. With the device comprising the present invention the denier determination of the yarns may be carried out easily and quickly during the manufacturing process without the delay occasioned by carrying samples to the testing laboratory.

Another feature of the present invention is that it may be carried from place to place as needed. The operation of the instrument is so simple that anyone may use it. In order to test the yarn it is only necessary to hold the device in one hand and with the other hand loop the thread being measured around the knob provided and then pull the thread until it breaks. The denier of the yarn tested is then read from the indicator dial.

It is therefore one object of the present invention to provide a denier measuring device which may be operated without requiring any particular skill.

Another object of the present invention is to provide a yarn measuring instrument which is of simple and durable construction and inexpensive to manufacture.

Still another object of the present invention is to provide a yarn measuring instrument of a portable nature and which does not require any supporting means other than the hand of the operator.

These and other objects will in part become obvious and will in part be pointed out hereinafter.

To the attainment of the aforesaid objects and ends, my invention consists in the novel feature of construction and in the combination, connection, and arrangement of parts, hereinafter more fully described, and then pointed out in the appended claims.

In the drawings.

Fig. 1 is a plan view of the device comprising the invention,

Fig. 2 is a longitudinal cross-sectional view taken on the line 2—2 of Fig. 1,

Figure 3:
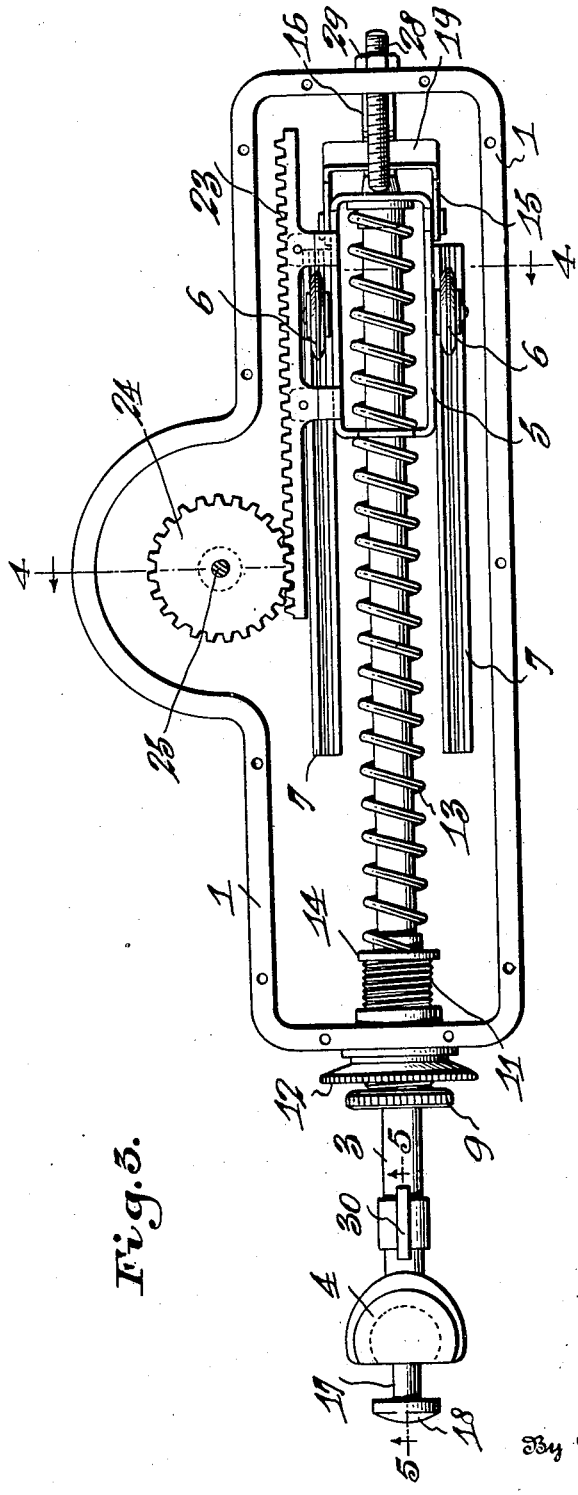
Fig. 3 is a plan view of the device with the cover plate removed.
Figure 4:
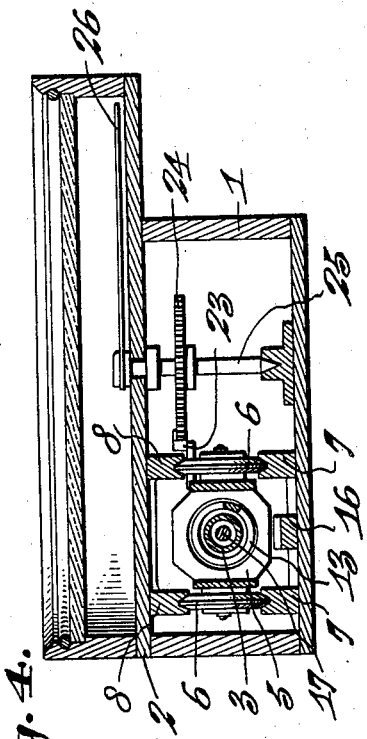
Fig. 4 is a cross-sectional view taken on the line 4—4 of Fig. 3.
Figure 5:
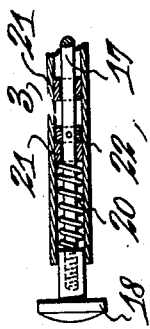
Fig. 5 is a detail sectional view taken on the line 5—5 of Fig. 3.

In the drawings, in which like numerals of reference indicate like parts in all of the figures, 1 refers to the casing of the measuring instrument in which the operating parts are mounted. Removably attached to the casing 1 is a cover plate 2.

The operating parts of the measuring instrument comprise a tubular member 3 which is slidably mounted in an end wall of the casing 1 and extends therebeyond.

Securely mounted on the outside end of the tube element 3 is a thread hook 4 around which the test yarn is looped.

The tubular element 3 has mounted on its other end within the casing 1 a carriage 5 to which is attached rollers 6—6. The rollers 6—6 ride in grooved tracks, one pair of which tracks 7—7 are attached to the bottom of the casing 1, the other tracks 8—8 being mounted on the bottom of the cover plate 2. Such an arrangement greatly facilitates the operation of the tubular element 3 by eliminating to a great extent the factor of friction.

Where the tube 3 extends through the casing 1 a bushing 9 is provided having a base 10 in which the tube 3 slides.

The bushing 9 is threaded as indicated at 11 and screwed into the casing wall for a purpose later to be more fully explained.

A lock nut 12 secures the bushing 9 against movement.

Mounted on the tube 3 is an expansion spring 13 of predetermined strength. The spring 13 bears against the carriage 5 at one end and at the other end against a bushing 14 which abuts the bushing 9 thus always tending to force the tube 3 inwardly against the pull of a thread looped around the thread hook 4.

In order to hold the tube 3 in position when it has been pulled out a certain distance a pivoted latching lever 15 is mounted on the carriage 5 and meshes with a rack bar 16 preventing return movement of the tube 3.

Releasing means for allowing return of the tube 3 comprises a releasing rod 17 which extends through the tube 3.

The releasing rod 17 has mounted on one end thereof a finger knob 18 and at the other end is adapted to contact the bridge portion 19 of the latching lever 15 when the knob 18 is pushed.

A spring 20 is provided to normally hold the releasing rod 17 out of engagement with the latching lever 15.

Abutment bushings 21—21 are mounted in spaced relation within the tube member 3 for the purpose of limiting the movement of the releasing rod 17 by reason of a collar 22, which is pin connected to the rod 17, contacting one of said bushings at either extreme of the releasing movement.

Mounted on the carriage 5 is a rack bar 23 which meshes with a gear 24 secured to a shaft 25. The shaft 25 carries at its upper end an indicator hand 26.

As the tube member 3 is pulled outwardly the hand 26 is rotated around a dial 27 which is calibrated to indicate the denier of the yarn tested.

Means are provided whereby the zero point of the indicator hand may be corrected. These means comprise an abutment screw 28 against which the carriage 5 is pressed. By releasing the lock nut 29 the screw 28 may be screwed in or out to regulate the inward movement of the tube 3.

The tension of the spring 13 may also be changed by releasing the lock nut 12 and screwing the threaded bushing 9 inwardly or outwardly as desired.

This novel instrument makes use of the fact that the breaking strength of a yarn of a given denier is fairly constant and in more or less proportion to the denier. Therefore, in operation the operator holds the instrument with one hand and with the other hand loops the thread around the thread hook 4, the two ends of the thread being held.

The operator then pulls with the hand holding the thread thus pulling the tube 3 outward against the tension of the calibrated spring 13. This pull is continued until the thread breaks.

As hereinbefore pointed out, the indicator hand 26 is rotated around the dial 27 and on breakage of the thread indicates the denier of the thread on the dial and continues to do so until the releasing rod 17 is operated by the operator pressing a finger against the knob 18 while grasping the hand hold 30 mounted on the tube 3.

From the foregoing description, taken in connection with the accompanying drawings, it is thought the complete construction, operation and advantages of my invention will be clear to those skilled in the art to which it relates.

What I claim is:

1. A yarn testing device comprising a casing, a tubular member slidably mounted in an end wall of said casing and extending to the outside thereof, a thread hook mounted on the outside end of said member, a carriage mounted on the inner end of said tubular member, means to allow only endwise movement of said carriage, rollers mounted on said carriage, trackways in said casing in which said rollers ride, a spring mounted to oppose a predetermined force against the pull of a thread looped around said thread hook, and means operated by said tubular member to indicate in terms of denier the breaking strength of the thread.

2. A yarn testing device comprising a casing, a tubular member slidably mounted in an end wall of said casing and extending to the outside thereof, a thread hook mounted on the outside end of said member, a carriage mounted on the other end of said tubular member and slidable therewith, said carriage being movable only in an endwise direction within said casing, rollers mounted on said carriage, trackways in said casing in which said rollers ride, a spring mounted to bear against said carriage and oppose a predetermined force against the pull of a thread looped around said thread hook when said tubular member is pulled outward by said thread, means operated by said tubular member to indicate in terms of denier the breaking strength of the thread, and means to prevent the return of said tubular member as said thread breaks.

3. A yarn testing device comprising a casing, a tubular member slidably mounted in an end wall of said casing and extending to the outside thereof, a thread hook mounted on the outside end of said member, a carriage mounted on the other end of said member and slidable therewith, said carriage being movable only in an endwise direction, a spring mounted to bear against said carriage and oppose a predetermined force against the pull of a thread looped around said thread hook when said tubular member is pulled outward by said thread, means operated by the movement of said tubular member to indicate in terms of denier the breaking strength of the thread, and means to prevent the return of said tubular member as said thread breaks comprising a pivoted pawl mounted on said carriage, a toothed rack mounted in said housing and engaged by said pawl, and means to release said pawl from said rack to allow the return of said tubular member.

4. A yarn testing device comprising a casing, a tubular member slidably mounted in an end wall of said casing and extending to the outside thereof, a thread hook mounted on the outside end of said member, a carriage mounted on the other end of said member and slidable therewith, said carriage being movable only in an endwise direction, a spring mounted to bear against said carriage and oppose a predetermined force against the pull of a thread looped around said thread hook when said tubular member is pulled outward by said thread, means operated by the movement of said tubular member to indicate in terms of denier the breaking strength of the thread, and means to prevent the return of said tubular member as said thread breaks comprising a pivoted pawl mounted on said carriage, a toothed rack mounted in said casing and engaged by said pawl, and means to release said pawl from said rack to allow the return of said tubular member, said last mentioned means comprising a rod slidable within said tubular member, one end of said rod adapted to raise said pawl when moved thereagainst, said rod extending beyond the outside end of said tubular member, and means to normally hold said rod out of engagement with said pawl.

5. A yarn testing device comprising a casing, a tubular member slidably mounted in an end wall of said casing and extending to the outside thereof, a thread hook mounted on the outside end of said member, a carriage mounted on the other end of said member and slidable therewith, rollers mounted on said carriage, trackways mounted within said casing in which said rollers ride, a spring mounted to bear against said carriage, and oppose a predetermined force against the pull of a thread looped around said thread hook when said tubular member is pulled outward by said thread, means operated by the movement of said tubular member to indicate in terms of denier the breaking strength of the thread, and means to prevent the return of said tubular member as said thread breaks comprising a pivoted pawl mounted on said carriage, a toothed rack mounted in said casing and engaged by said pawl, and means to release said pawl from said rack to allow the return of said tubular member, said last mentioned means comprising a rod slidable within said tubular member, one end of said rod adapted to raise said pawl when moved thereagainst, said rod extending beyond the outside end of said tubular member and means to normally hold said rod out of engagement with said pawl.

6. A yarn testing device comprising a casing; a tubular member slidably mounted in an end wall of said casing and extending to the outside thereof; a thread hook mounted on the outside end of said member; means mounted within said casing and bearing against the other end of said member to oppose a predetermined force against the pull of a thread looped around said thread hook; and means operated by said tubular member to indicate in terms of denier the breaking strength of the thread, said last mentioned means comprising a rotatable shaft, an indicator hand mounted on said shaft and rotatable therewith, a fixed gear mounted on said shaft, a rack mounted to slide with said tubular member and mesh with said gear, a carriage rigidly supporting said rack; and rollers mounted on said carriage.

7. A yarn testing device comprising a casing; a member slidably mounted in said casing, one end of said member extending beyond said casing; a thread hook mounted on the outside end of said member; means bearing against the other end of said member tending to oppose the pull of a thread looped around said thread hook; and means operated by said slidable member to indicate in terms of denier the breaking strength of the thread, said last mentioned means comprising a rotatable shaft, an indicator hand mounted on said shaft and rotatable therewith, a fixed gear mounted on said shaft, a rack mounted to slide with said slidable member and mesh with said gear, a carriage rigidly supporting said rack; and rollers mounted on said carriage.

8. A yarn testing device comprising a casing; a member slidably mounted in said casing, one end of said member extending beyond said casing; a thread hook mounted on the outside end of said member; means bearing against the other end of said member tending to oppose the pull of a thread looped around said thread hook; means operated by said slidable member to indicate in terms of denier the breaking strength of the thread, said last mentioned means comprising a rotatable shaft, an indicator hand mounted on said shaft and rotatable therewith, a fixed gear mounted on said shaft, a rack mounted to slide with said slidable member and mesh with said gear, a carriage rigidly supporting said rack, and rollers mounted on said carriage; means to hold said slidable member from returning to its former position after breakage of said thread; and means to release said holding means.

HERBERT NAUMANN.